Dec. 21, 1954 — C. C. HERITAGE ET AL — 2,697,703
FRACTIONATION OF LIGNOCELLULOSE MATERIALS
Filed Feb. 9, 1951
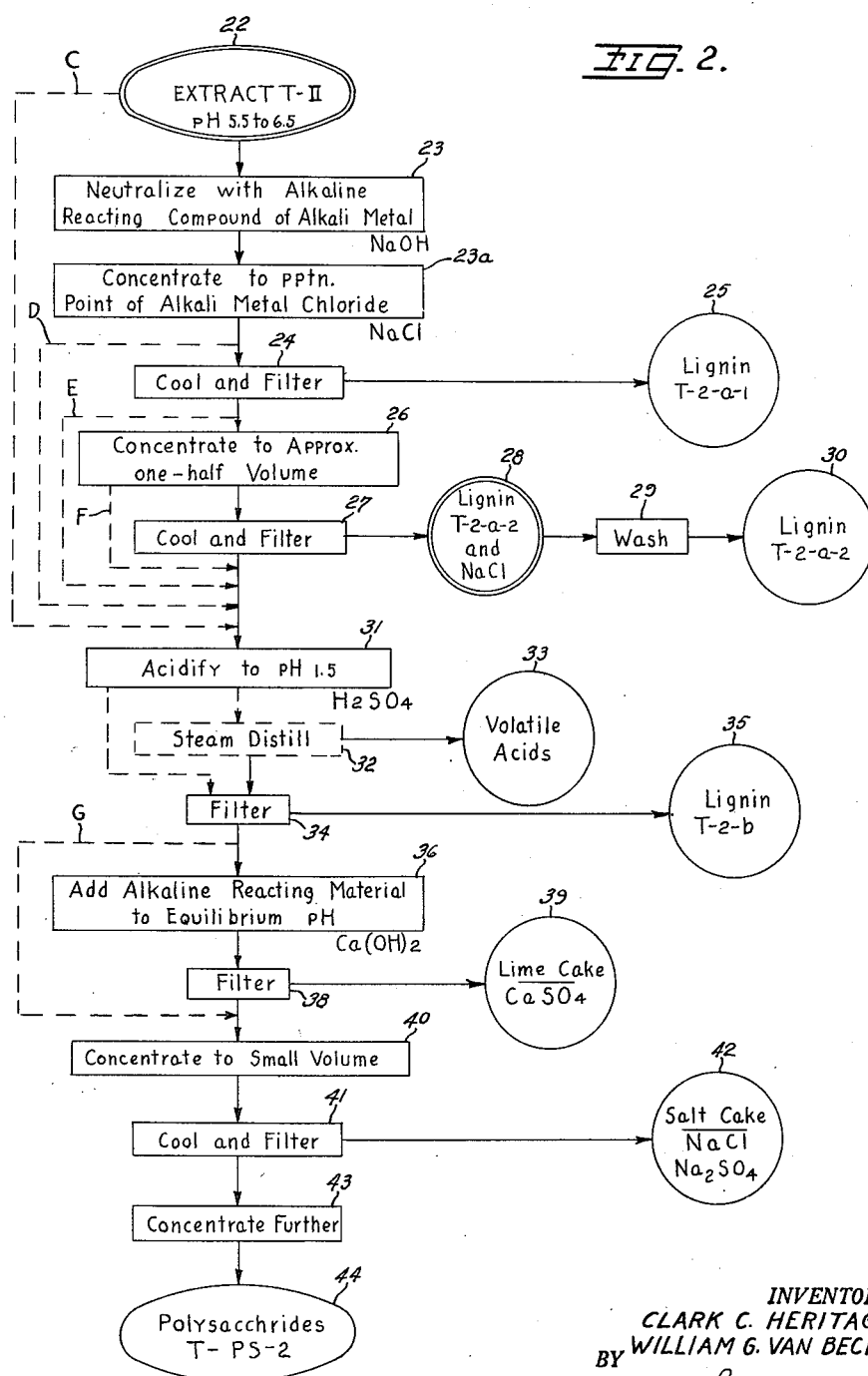

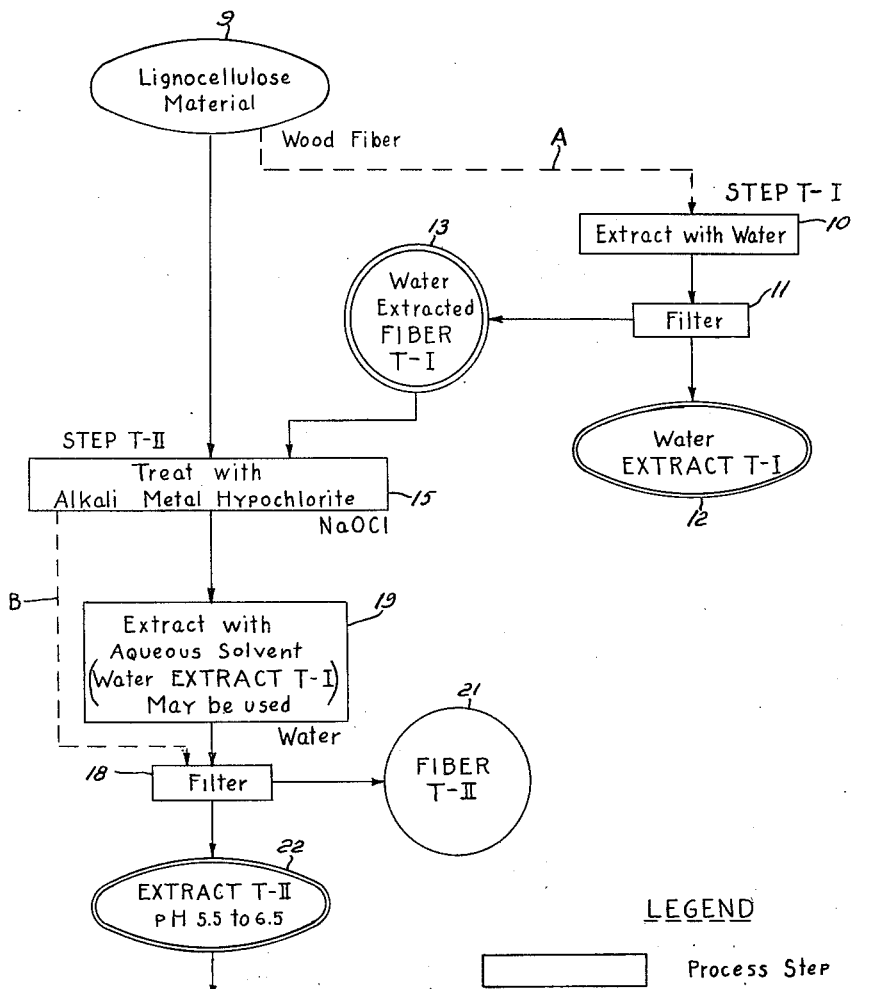

United States Patent Office 2,697,703
Patented Dec. 21, 1954

2,697,703

FRACTIONATION OF LIGNOCELLULOSE MATERIALS

Clark C. Heritage, Tacoma, and William G. Van Beckum, Longview, Wash., assignors, by direct and mesne assignments, of one-half to Weyerhaeuser Timber Company, Tacoma, Wash., a corporation of Washington, and one-half to Wood Conversion Company, St. Paul, Minn., a corporation of Delaware Application February 9, 1951, Serial No. 210,236

19 Claims. (Cl. 260—124)

This invention relates to a process for the isolation of non-cellulosic chemical products from lignocellulose materials with recovery of cellulosic fiber as an attendant product. More particularly the invention pertains to the separation of lignocellulose materials comprising cellulose, lignin, and polysaccharides-other-than-cellulose, into non-cellulosic substances, i. e., lignins, and other organics having a substantial content of polysaccharides-other-than-cellulose and a cellulosic fiber residue of variable but controllable composition.

The process of the invention is applicable to a diversity of lignocellulose materials, but is especially applicable to the fractionation of wood substance. Substantially all kinds of woods may be thus fractionated, representative and suitable woods being aspen, jack pine, western larch, Douglas fir, and many others. Substantially the same procedure and variations of it may be employed with all these varieties of woods, the results varying in degree.

In practicing the present invention, when wood is used as a source of lignocellulose materials, it is first reduced to finely divided or fibrous form by mechanical or other methods which do not subject the wood to the action of added chemicals other than water. Thus, wood fiber, sawdust, hogged fuel and similar forms of comminuted wood or lignocellulose material are suitable raw materials for the practice of the invention. If the wood is fiberized, the fiberization is preferably carried to the point where it results in the conversion of the wood substance to fibers physically consisting substantially all of ultimate fibers and opened-up bundles of ultimate fibers, hereinafter all referred to as fiber, and constitutionally consisting primarily of cellulose, lignin, and other organics including polysaccharides-other-than-cellulose, the latter being herein frequently referred to merely as "polysaccharides," these three constituents being present in mutual ratios in the range of compositions from those characterizing the raw wood from which the fiber is derived to those characterizing the water-insoluble content of the raw wood from which the fiber is derived. Fiber containing cellulose, lignin, and other organics including polysaccharides-other-than-cellulose in the ratios characterizing the water-insoluble content of the raw wood from which the fiber is derived, is exemplified by raw wood fiber which has been so treated with water as to extract the water-soluble constituents and leave as a fibrous residue the water-insoluble content of the raw wood. The production of such fiber from woods such as western larch is of particular interest, since these woods contain high percentages of water extractable substances, e. g., about 23% in the case of western larch. It may, therefore, be commercially desirable in the case of these woods to extract them with water in order to isolate as commercial products the natural water-soluble fraction of the wood substance. A fiber form of the extracted wood may be employed to advantage as a raw material for the fractionation process of the instant invention.

The wood fibers to which the process of the invention may be satisfactorily applied may be produced, for example, by the method described in the U. S. Patent No. 1,913,607 to McMillan. This patent describes a mechanical defibering process entirely free from chemical action, which comprises combing out fibers from wood by contacting logs of wood with high speed rotary radial elements, such as pointed pins projecting from an axle, like bristles. Fiber produced by this process is herein referred to as McMillan fiber, or pin fiber, and it is an excellent raw wood fiber for the present invention. Such pin fiber may be processed with or without an initial water extraction.

Wood fiber suitable for use in the process of the present invention may also be prepared by the method described in U. S. Patent No. 2,008,892 to Asplund. In this method wood substance is defibered by mechanically rolling and crushing the wood between relatively rotating opposing disks, while simultaneously applying steam under sufficient pressure markedly to soften the lignin in the middle lamella, thus permitting easy defibration of the softened wood. The fiber resulting from this practice, in efficient operation of the commercial Asplund machine, is termed herein "normal" Asplund fiber, or normal defibrator fiber. It is prepared, for example, by so defibrating the wood while exposing it for about one minute to high pressure steam at a temperature sufficient to effect the desired softening. The significance of the term "normal" is with reference to practical minimum operating time and temperature, as described, because increase of temperature or time has a chemical effect on the wood substance which may be measured in terms of water-soluble content formed by the action of the steam.

Any other process for reducing wood substance to said ultimate fiber or opened-up bundle form may be employed. The wood substance may be affected by steam at any time or times before, during or after such defibration. Action by steam should be such as to avoid any substantial gasification of the wood substance which thus leads to loss or decomposition of wood substance, usually indicated by the formation of furfural, and evident in altered proportions of the three primary constituents, and by unduly altered forms of said constituents. Processes involving both defibering and steaming may be used. The fibers resulting from this process, which includes those resulting from the Asplund process, differ from the raw wood in that their water-soluble content has been to a greater or less degree increased by the treatment with steam. In the case of normal Asplund aspen fiber made in about 1 minute at about 128 pounds steam pressure, the increase in water-soluble content is about 4% to 5%, which is additive to a natural water-soluble content in raw aspen of about the same amount, variable, however, with the season of cutting and age of the tree. Thus, normal Asplund aspen fiber has about 8% to 10% of water-solubles. The term "wood" as used in this specification and claims comprehends either raw wood or steam-treated wood.

Other methods for producing fibers from wood substance may also be used, provided said methods do not subject the wood to the action of added chemical agents other than liquid water or steam, or substantially alter the constituents in a manner other than those stated.

Heretofore, lignocellulose material has been converted to pulp suitable for use in the manufacture of paper, fiberboard, and other products, by various mechanical and chemical methods, or combinations of such methods. It is well known, for example, to prepare paper-making pulp by treating raw wood with bisulfite salts, e. g., calcium bisulfite or magnesium bisulfite. It is also well known to subject raw wood to the action of numerous alkaline chemicals alone or in admixture, as in the well known soda, kraft or sulfate, and monosulfite processes. None of these methods, however, has affected the precise fractionation of wood substance by simple processes carried out under carefully controlled and standardized conditions at atmospheric pressures by a continuous process which facilitates the separation of useful lignin and polysaccharide products, while, at the same time, producing a high yield of useful cellulosic fiber of reproducible properties.

By way of orientation, and particularly with respect to the nomenclature employed, the present invention is a modification of a step-wise procedure devised for the carefully controlled decomposition of lignocellulose material, particularly wood, into its various chemical constituents, including fiber or other lignocellulose residue. The full process treatment comprises three basic steps, outlined as follows: treatment with sodium hydroxide (caustic), sodium hypochlorite, and sodium hydroxide (caustic). The process is, therefore, generally referred to as the CHC process, with the letters standing for caustic, hypochlorite and caustic, and the lignins produced by the process are referred to as CHC lignins, whether such lignins are produced by only one or all three of the basic steps. The three basic steps of the total process are also identified as Step I, Step II and Step III, and the products of each step are designated by corresponding numerals, as, for instance, Extract I, Fiber I and lignin 1 from Step I; Extract II, Fiber II, and lignin 2 from Step II; and similarly for Step III. Our copending application, Serial No. 33,278, now Letters Patent No. 2,541,058, granted February 13, 1951, dealt with the first of the three basic steps, i. e., the caustic or alkali treatment, identified as Step I, and the corresponding chemical products. Our copending application, Serial No. 210,234, dealt with the treatment through the first two basic steps, i. e., the caustic and hypochlorite treating steps, identified as Steps I and II, and also as the CH (caustic and hypochlorite) steps of the CHC process, and the corresponding chemical products. The present invention deals with the modification of the process wherein the first basic step of treatment with caustic is omitted, and the wood or other lignocellulosic material is subjected directly to the action of an alkali hypochlorite reagent; or, in other words, the process of the present invention begins with Step II, but, in order to differentiate the treatment of this invention from the hypochlorite treatment of Step II in Serial No. 210,234, which is preceded by a caustic treatment, all the nomenclature of steps and products corresponding to those in Serial No. 210,234 are preceded by the letter "T," said letter "T" being arbitrarily chosen for this purpose. Thus, the hypochlorite step of this invention is denominated Extract T–II, the fibrous residue is denominated Fiber T–II, and the chemical products are denominated Lignin T–2–a–1, etc.

An alternative sequence of an aqueous extraction of the lignocellulose material prior to subjection to the alkali metal hypochlorite is denominated Step T–I showing that it corresponds to Step I of our copending application Serial No. 33,278, now U. S. Patent 2,541,058, but with the caustic treatment omitted. The immediate products of this aqueous extraction are denominated Fiber T–I and water Extract T–I.

It is a general object of the present invention to treat lignocellulose materials of nature for isolating, on the one hand, mutually separable lignins and organics including polysaccharides-other-than-cellulose, and, on the other hand, a useful cellulosic product.

It is also an object of the present invention to separate lignocellulose materials into fractions together comprising isolated lignins, isolated organics including isolated polysaccharides-other-than-cellulose, and isolated cellulosic fiber of controllable quality.

It is an object of the present invention to use comminuted lignocellulose, with or without its water-soluble content, as a raw material for a chemical processing designated Step T–II to secure Extract T–II and Fiber T–II, and to win the extractives from Extract T–II, thereby to convert the said lignocellulose into one or more novel lignin products, a concentrate of organics including polysaccharides-other-than-cellulose, and a new and useful fiber of increased cellulose content compared with the raw lignocellulose.

It is a particular object of the invention to treat said lignocellulose fiber with aqueous alkali metal hypochlorite salt solution, as a solubilizing agent, which concurrently removes from the fiber a part of the lignin and other organics including polysaccharides-other-than-cellulose, and then to separate the resulting Extract T–II and the resulting Fiber T–II.

It is also an object of the invention to process the resulting Extract T–II for separating one or more of the kinds of extractives contained therein.

Another object of the invention is to recover from Extract T–II one or more novel lignin products, and a concentrate of organics including polysaccharides-other-than-cellulose.

It is also an object of the invention to process comminuted lignocellulose to Fiber T–II which is richer in cellulose, and poorer in lignin and polysaccharides-other-than-cellulose, than the original lignocellulose.

Other objects and advantages of the invention will become apparent from the following description and explanation in connection with the appended drawings wherein process steps are shown in rectangular blocks, materials in process are shown in double-line curved enclosures, and end products are shown in single ring circles. Precipitates are shown in circles disposed laterally of the filter step by which they are separated, and solutions resulting from filtration steps are shown in elliptical enclosures. Alternative sequences and steps are indicated in broken lines.

Preferred materials or reagents are shown at the lower left of each ring, block or enclosure. In the drawings:

Figure 1 represents the processing to secure Extract T–II and Fiber T–II.

Figure 2 represents the processing to recover extractives from Extract T–II.

It has been found that the above and other objects of the invention may be accomplished by subjecting comminuted lignocellulose, e. g. wood substance in fiber form, to the action of an alkaline solution of a hypochlorite salt of an alkali metal; separating a fibrous residue from the residual treating solution, and separating lignin and polysaccharides-other-than-cellulose from said residual solution.

More specifically stated, lignocellulose materials are fractionated in accordance with the present invention by treating such materials in comminuted form, either in an aqueous suspension or in moist condition of the lignocellulose particles, to the action of an alkali metal hypochlorite salt in the presence of sufficient water to permit interaction, thereby rendering soluble quantities of lignin and polysaccharides-other-than-cellulose, separating the resulting lignocellulose residue from the resulting weakened or exhausted solution, and separating the dissolved lignin and dissolved polysaccharides from each other and from the residual solution.

Natural wood may contain up to about 23% by weight of water-soluble material, the figure applying particularly to western larch. In the event the natural wood has been treated with steam or hot water, the water-soluble content is increased over that native to the wood. In the case of aspen wood the natural content of 4% to 5% is increased to 8% to 10% by defibering it in the Asplund machine at about 128 lbs. per sq. in. gauge pressure and in about 60 seconds through the machine. Because the water-soluble content of both lignin and other organics consumes the active ingredients of the hypochlorite salt solution, the effect of the latter on the water-insoluble content of the fiber treated is lessened by such consumption. It is, therefore, preferable in the interests of economy to extract the water-solubles from the fiber to be treated with the hypochlorite salt solution. This extraction is designated Step T–I, as hereinbefore explained.

DESCRIPTION OF FIGURE 1

In Figure 1 of the drawings the lignocellulose material, of which wood fiber is a preferred raw stock, is designated by numeral 9. For convenience in making the subsequent description, an alternative sequence, designated by the broken line A, will first be described. In alternative sequence A, the lignocellulose material 9 is extracted with water at step 10, such step being designated Step T–I. The water extracted mass is then separated by filtration as at step 11, to provide, as product 12, water Extract T–I and, as product 13, a water extracted Fiber T–I. The water Extract T–I contains tannins and other water soluble extractives, containing as much as about 23% of the original wood substance, in the case of some species of wood, such as western larch. The water Extract T–I may be processed independently for recovery of its content, or it may be used as a wash water in the subsequent practice of Step T–II, as will be subsequently described. The water extracted Fiber T–I, product 13, is, of course, an intermediate product for further processing by Step T–II.

Details for practice of the water extraction step may vary. The extraction may be repeated using the same water extract several times on fresh batches of lignocellulose, or a counter-current system may be used, to build up the concentration of the extract and to provide Fiber T–I which is relatively free of water-soluble material.

The lignocellulose material, whether it be the raw stock as shown at 9, or the water extracted Fiber T–I as shown at 13, is treated with alkali metal hypochlorite solution, preferably using sodium hypochlorite, as indicated at step 15. This treatment comprises Step T–II. The hypochlorite solution has a pH of from slightly alkaline, say about 7.5 to about 10.5. A pH of from 8.0 to 8.3 is preferred. The treatment may be conducted on either moist fiber or with the fiber in aqueous suspension.

Functionally, the hypochlorite is a fractionating agent for lignocellulose by partial solubilization. The prototype or prototypes of the lignin products and polysaccharides fractionated out by Step T–II are solubilized relative to aqueous media by the action of hypochlorite, whether the action be regarded as chlorination or an oxidation. The solubilization and fractionation effect of the hypochlorite applies as well to the saccharides as to the lignins. The reaction with the two classes of chemicals is concurrent. The Step T-II treatment reaches an asymptote and can go no further than a certain maximum removal. However, the hypochlorite changes the chemical nature of the lignocellulose residue which remains insoluble, both with respect to the hypochlorite treating solution itself and with respect to aqueous extraction, so that, although insoluble so far as Step T-II is concerned, a partial content of the lignocellulose residue is conditioned for solubilization by further chemical treatment in succeeding steps, such as with sodium hydroxide. Although any of the alkali-metal hypochlorites may be used, sodium hypochlorite is a preferred member of the group because of its ready availability and its efficient action.

The hypochlorite salt may be a commercially available product, or, if desired, it may be prepared immediately before use. Thus, a sodium hypochlorite solution of the desired concentration may be prepared by passing chlorine into a solution of sodium hydroxide having a pH of 11 to 12 until the precalculated quantity of chlorine for the quantity of NaOH used has been absorbed or until the pH of the alkali solution has been lowered to a value of about 8.0 to 8.3. The reaction ratio for the preferred pH, based on parts by weight, is about 100 parts of sodium hydroxide to 85 parts of chlorine. However, the pH of the hypochlorite solution may range from values slightly above 7.0 to about 10.5, in which case the ratio of NaOH to chlorine will vary accordingly. The solution is preferably kept cold during this process, as by mixing ice therewith.

The amount of hypochlorite salt used is variable depending upon the condition and species of wood being treated, low cellulose woods requiring a greater amount of hypochlorite salt than those of higher cellulose content. For substantially complete action by hypochlorite salt, the maximum amount will vary with the wood species and with the previous treatment. The usage of hypochlorite salt is herein expressed as the amount of sodium hydroxide equivalent of the hypochlorite salt actually used. Thus, an 80% usage signifies that for 100 parts by weight (dry basis) of fiber treated by hypochlorite salt, 80 parts of sodium hydroxide is treated, as at about 0° C., with chlorine to effect the desired pH, and the resulting solution is employed on the fiber. The hypochlorite treatment usually does not require higher than an 80% usage. By way of example, jack pine and other coniferous woods require about a 70% usage; while aspen requires about a 35% usage, for substantial completion of the step, where the original fiber is raw wood such as McMillan fiber.

The dilution of the hypochlorite salt solution and the consistency of the mass of fiber being treated by said solution are related by the above mentioned usage of hypochlorite salt. Thus, where the mass being treated is such that it may be stirred by an agitator in a containing vessel, a consistency of about 4% is a practical operating consistency, meaning that about 4 parts by weight of fiber are present in 100 parts by weight of solution. Accordingly, an 80% usage of hypochlorite salt at 4% consistency designates that for every 100 parts by weight of fiber (dry basis) there are about 2500 parts of water, and that 80 parts of sodium hydroxide equivalent have been used. In terms of sodium hydroxide used to form hypochlorite salt, the solution is 3.1% in strength by weight.

It usually is not practical to replenish and recycle the aqueous alkaline hypochlorite solution employed in the T-II step to build up the content of extractives. This is in part because of the mineral content of the solution and also because a considerable amount of organic materials, which are present in the alkaline hypochlorite salt solution after it has been once used, react with and consume fresh hypochlorite salt which might be added thereto in order to build up the hypochlorite salt concentration to an effective degree. The operation is, therefore, preferably a single cycle operation.

The consistency of the mixture of hypochlorite and fiber may vary throughout a wide range. Consistencies of from 4% to 25%, i. e., 4 parts by weight of fiber per 100 parts of solution to 25 parts by weight fiber per 100 parts solution, have been satisfactorily used. Consistencies in aqueous suspension up to 15% may be satisfactorily employed for the hypochlorite treatment, but the use of consistencies above 15% with aqueous suspensions results in the production of a non-uniform Fiber T-II product, which means, of course, that the chemical content of the wood is not being uniformly extracted, and that the yield and identity of the chemical products obtained from the solution will vary in a greater degree.

Treatment with consistencies above 15% should be effected by spraying the hypochlorite solution in a strong jet onto a moist or dry fiber while vigorously mixing the same in order to insure uniformity of treatment. A typical, preferred treatment is that of spraying a hypochlorite solution on moist fiber so as to provide a 20% consistency and a 20% usage of hypochlorite salt.

Treating times for Step II of from 15 to 20 minutes up to about one hour usually effect substantially complete removal of the wood content susceptible to removal by the hypochlorite solution, with but little further action being observed during more protracted treatments. The proper time within the range mentioned depends on various factors, but principally on the consistency and usage employed, which in turn determines the temperature of the reaction.

The temperature of the hypochlorite treatment may vary over a wide range, for example, from below normal room temperature up to at least 75° C. Higher temperatures up to the boiling point of the hypochlorite solution may be used under some conditions. Superatmospheric pressures, and the temperatures which accompany such pressures, are avoided at all times, as such pressures and temperatures would cause excessive degradation of the fiber residues and the chemical products of decomposition. In other words, it is essential to the carefully controlled decomposition of the lignocellulose in accordance with the principles of the present invention that each treating step be conducted at atmospheric pressure.

The exothermic heat of reaction is sufficient to raise the temperature from room temperature to 60° to 75° C., and the mixing is continued until the mass cools to a temperature of approximately 25° C., which is usually from about 30 minutes to 1 hour in the case of treatment in aqueous suspension. Where the spraying technique is used, the reaction is substantially complete in 15 to 20 minutes.

Temperature variously affects the treatment as to extracted content and as to the properties of the residual fibers. The higher temperature the more polysaccharides-not-cellulose are removed from the fiber. Temperatures lower than 25° C. have been used satisfactorily, and chilling to below room temperature has been practiced. When it is desired to limit the rise in temperature, the treatment may be conducted in the presence of ice or in refrigerated apparatus. As pointed out hereinbefore, the sodium hypochlorite solution is preferably kept cold during its formation by chilling with ice. It is, therefore, convenient to use this solution in its chilled condition, directly as formed.

As the reaction of the hypochlorite with the lignocellulose material proceeds, the hypochlorite is consumed, and the pH of the reaction mass is lowered until, at the conclusion of the reaction, the reaction solution, Extract T-II, has a pH on the acid side, usually in a range from 5.5 to 6.5.

After the reaction, the extract and the fiber residue are separated, with washing of the fiber as required. If the consistency of reaction mass as treated at 15 is low, a filtration may be practiced directly as indicated by broken line B leading to filtration step 18. If reaction mass at 15 is at high consistency, it may be extracted by water or other aqueous solvent, as indicated at 19. Extract T-I may be used as the said aqueous solvent, if desired, to add its extracted water-solubles to the extract created and rendered soluble in reaction step 15. The wash water used on Fiber T-II of a previous batch may likewise be used as the diluent of the reaction mass 15 for the extraction step 19. The extraction step 19 as discussed and defined herein is deemed to include the extracting effect of the aqueous solution of hypochlorite salt without resort to a separate aqueous extraction where the hypochlorite solution is sufficiently dilute to provide good extracting action. When a separate aqueous extraction step 19 is conducted, water is usually the extracting solvent employed, although water Extract T-I or wash waters may be employed as pointed out above. To the water, there may also be added minor amounts of other materials, e. g., water miscible solvents such as methanol, ethanol or acetone, in order to contribute specific properties to the solvent or for specific purposes. Water alone, or with such other materials admixed therein, is herein referred to as an aqueous solvent.

After the separation at step 18 there is yielded a Fiber T–II at 21 and an Extract T–II at 22. The fiber residue 21, washed or not, may then be used without further treatment, in a variety of ways, or used as raw material for additional processing.

DESCRIPTION OF FIGURE 2

The hypochlorite treatment solution (Extract T–II) is processed for the separation of valuable lignin and polysaccharide products therefrom, as represented in Figure 2 of the drawings. The process provides for the separation of the lignin content of the extract into fractions herein arbitrarily designated as lignin T–2–a–1, T–2–a–2, and T–2–b, and a polysaccharide product T–PS–2. In accordance with this procedure, extract 22 is first neutralized to approximately pH 7 at step 23, and then concentrated (dewatered) by evaporation at step 23a. Since the said extract 22 is acid in reaction, having a pH of about 5.5 to 6.5, the neutralization is effected by the addition of a suitable alkaline reacting compound of an alkali metal such as sodium hydroxide. The concentration of the neutralized solution is carried on to a point prior to crystallization of the alkali metal chloride content (usually sodium chloride) of the extract. The reduced concentration at which the saturation point of the alkali metal chloride content of the solution is achieved can be calculated in advance from the quantity of reagents used. In order to avoid contamination of the lignin product, which is concurrently being precipitated with the reduction in volume of the solution, the concentration should be stopped before the volume has been reduced in quantity to the point at which crystallization of the alkali metal chloride will occur. In a typical case this requires evaporation of the solution down to about 12% of its original volume. The neutralized, concentrated solution is then cooled and filtered in step 24. This results in the separation of a solid lignin product shown at 25 and designated lignin T–2–a–1. This product will be relatively free from contamination by the alkali metal chloride salt, if the foregoing instructions of reducing the volume to an amount just above the saturation point of the salt are observed. In the event that any salt is obtained from the lignin T–2–a–1, it may be removed by washing with an aqueous wash, preferably slightly acidified.

The filtrate remaining after the separation of the said solid lignin T–2–a–1 is then further concentrated, as to about half its volume at 26, this degree of concentration being necessary since the hypochlorite extract (Extract II) is not a recycled extract and the dissolved organic content is correspondingly low. The concentrated solution is then cooled and filtered at step 27 to recover as product 28 a quantity of solid lignin designated T–2–a–2. This product will necessarily be contaminated with a considerable quantity of crystallized inorganic salt. (NaCl when sodium hydroxide or other sodium compound was used as the neutralizing agent in step 23.) The salt is removed by an aqueous wash indicated at step 29, the wash water being preferably slightly acid and limited in volume, resulting in the production of a purified lignin T–2–a–2, product 30.

The solution is next acidified to a pH of 1.5 at step 31, preferably using sulfuric acid or an acid sulfate salt. If desired, it may be steam distilled at step 32 to separate the volatile acids 33 from the acidified solution. Any acid, or acidic agent, having an ionization potential sufficient to lower the pH to 1.5, may be employed, but preferred acidic materials are sulfuric acid or sodium acid sulfate, inasmuch as the sulfate radical lends itself to easy removal during subsequent steps. The solution from which the volatile acids may or may not have thus been removed is then filtered at step 34 in order to separate the precipitated lignin and recover the same as product 35. The lignin material of product 35 is designated lignin T–2–b.

After removal of lignins T–2–a–1, T–2–a–2 and T–2–b as described above, there is added at step 36 an alkaline reacting material, preferably of the group consisting of hydroxides, oxides or carbonates of an alkaline-earth metal, in an amount sufficient to bring the pH to equilibrium in order to neutralize the acidity of the solution and thus facilitate its further processing, storage and handling. Neutral or slightly alkaline solutions present much less processing difficulties than acidic solutions, and also avoid corrosion of metal containers to a much greater extent. Hydrated calcium hydroxide is the preferred reagent, as its use avoids excess heat or the formation of carbonic acid gas, effected by the other choices. Assuming that sulfuric acid or sodium acid sulfate has been used as the acidifying reagent in step 31, and that calcium hydroxide is used as the neutralizing agent at step 36, an amount of calcium sulfate is precipitated equivalent to the amount of sulfate ion due to free sulfuric acid, which is then removed by filtration at step 38 as lime cake 39.

If desired, calcium carbonate, calcium oxide, or any other alkaline material may be used as the neutralizing agent in step 36. If calcium carbonate is employed, the treated solution should be heated in order to drive off the dissolved carbon dioxide. While, ordinarily, the neutralization pH is 7.0, it will be found that an equilibrium pH ranging from 7.0 to about 8.5 may be obtained at this step, due to the presence of salts of weak acids. When the salts of the alkaline materials employed in step 36 are soluble, as, for example, when sodium hydroxide is used, the inorganic salt content of the final solution is increased.

The lime cake 39 may be washed with water for recovery of occluded organic materials. The wash waters are then combined with the filtrate from filtration step 38. The filtrate still includes, in addition to its polysaccharide and other organic content, a substantial quantity of sodium or other alkali salts.

A further amount of the inorganic content of the filtrate from filtration step 38 may then be removed by concentrating the solution to a small volume as shown at step 40, thereby effecting the crystallization of inorganic salts, such as sodium chloride and sodium sulfate as the salts obtained when sulfuric acid is used as the acidifying agent at step 31. The crystallized inorganic salts are then removed as salt cake 42 by filtration at step 41. Separation of the sodium sulfate as a solid is facilitated by the technique known as "freezing out" in which the solution is cooled prior to filtering to lower the solubility product value of the sodium sulfate. Further concentration of the solution at step 43 results in the production of a solution of organics including polysaccharides, product 44, designated as T–PS–2, which may be used without further treatment as a source of polysaccharides, or which may be processed further to separate solid polysaccharides therefrom.

MODIFICATIONS

It is apparent that the foregoing scheme for the fractionation of the hypochlorite extract 22 (Extract T–II) may be modified as desirable or necessary to suit extracts of varying characters derived from various types of lignocellulose materials, or, again, it may be desired in some cases to obtain all the lignin as a single product, rather than separating it in stepwise manner into three products as indicated in the flow plan.

Various alternative sequences for the practice of the process of the invention are illustrated by broken lines in Figure 2. It will be observed that by following the sequence designated as C, wherein extract T–II is directly acidified to a pH of 1.5, all the lignin content of extract T–II will be precipitated as one product and be recovered at the place illustrated in Figure 2 as product 35. As a result of such direct lowering of the pH to 1.5, all the lignin content will be precipitated in a single composite product, which may be designated lignin T–2. It may be desirable in the course of taking the pH directly to 1.5 to concentrate the solution in order to improve or provide the necessary precipitation characteristics for the lignin. The use of the concentration technique to improve the precipitation characteristics of the lignin is illustrated by the alternative sequence D. Conditions for improving the precipitation characteristics of lignins are disclosed and defined in our copending application, Serial No. 33,278, now U. S. Patent 2,541,058, where it is shown that establishing a concentration of inorganic salt in the lignin-pregnant solution, either by removing water of solution or by adding inorganic salt, constitutes a conditioning treatment which facilitates precipitation of the lignin.

By following the alternative sequence shown as E there will be obtained product 25, lignin T-2-a-1, as shown, and then, since the filtrate from lignin T-2-a-1 is acidified directly to pH 1.5, without the exercise of concentration step 26 and the filtration step 27, all the remaining lignin content consisting of lignin T-2-a-2 and lignin T-2-b will be obtained as one composite product at the same point in the process as represented by product 35 in Figure 2. The same results are obtained by practicing the alternative sequence F, except that in this case, by virtue of the practice of step 26, greater efficiency of the precipitation of both lignin T-2-a-2 and lignin T-2-b is obtained. However, in this case, a certain amount of the alkali metal chloride is obtained along with the composite lignin product obtained at step 34, and, if it is desired to purify the lignin product, the alkali metal chloride may be removed by washing in the manner of step 29 in the practice of the full process illustrated in Figure 2.

Many other sequences may be practiced which are not illustrated. For instance, if it is desired to obtain lignins T-2-a-1 and T-2-a-2 as a single composite product, which would then be denominated lignin T-2-a, the concentration of step 23a is continued to the point indicated in step 26 without the practice of filtration step 24.

The process may also be modified by practicing the same as illustrated in Figure 2 through step 27, and then by making further additions of acids stepwise to a plurality of successively decreasing values in the range from 7 to 1.5, and filtering off at any such pH any lignin which precipitates thereat. In the scheme of the nomenclature devised, such lignins would be identified as lignin T-2-b-1, lignin T-2-b-2, etc.

Also, it is possible to use or to omit the steam distillation to separate volatile acids at step 32, as indicated. Alternative procedures are also possible, or may be necessary, in the treatment of the filtrate from step 34 in order to obtain a purified polysaccharide product, T-PS-2. In the event an acid has been employed other than sulfuric in step 31 (referring to Figure 2), whose anion can appropriately be precipitated by a suitable reagent, such reagent may be used, either alone, or in addition to an alkaline reacting material as specified for use at step 36.

In the event the acid employed in step 31 of the process cannot be precipitated by the addition of a suitable reagent as at step 36, the solution may be treated by the alternative procedural sequence G. The organic salt content may be substantially removed, as indicated by steps 40 and 41, by the employment of a concentration by evaporation procedure or a "freezing out" technique, whereby the solution is first concentrated to a small volume and then cooled, thereby causing the inorganic salts to crystallize out of the solution, after which they may be removed by filtration. A combination of concentration and "freezing out" techniques may be employed. By "freezing out" is meant the lowering of the temperature of the solution to a value at which the inorganic salt content becomes relatively insoluble, thereby causing it to crystallize from solution. The salts which thus crystallize out are filtered at step 41 and recovered as a salt cake 42, leaving the filtrate as a syrup consisting of a substantially pure T-PS-2 product.

Still other modifications may be introduced into the outlined procedure as necessary to fit the process to products of varying character.

PREFERRED EMBODIMENT

A preferred process of the invention is illustrated by the following examples as applied to different species of wood. The yields and composition of the products obtained are summarized in tables following the examples.

EXAMPLE I

McMillan aspen fiber (fiber prepared from aspen wood by means of the McMillan defibrator) was extracted with a dilute aqueous solution of sodium hypochlorite. The sodium hypochlorite solution employed in this extraction was prepared by passing chlorine gas into a solution of sodium hydroxide of about 1.4% content by weight of sodium hydroxide, that amount being equivalent to 35% by weight of the fiber (dry basis) to be treated. Chlorine gas was passed into this solution until the pH of the solution had decreased from about 11 to 12 to about 8.0 to 8.3. This required the reaction of the sodium hydroxide with approximately an equal weight of chlorine. The reaction mixture was cooled with ice during this addition. Use of this solution in the treatment of the fiber resulted in the formation of a mixture having a consistency of about 4% (i. e., one containing about 4 parts of fiber per 100 parts of suspension). The fiber was extracted with this solution for about 1 hour at a temperature of about 25° C. At the end of this time the mixture had become acid, the final pH being about 5.5 to 6.0. The spent solution was separated from the fiber, the fiber being washed with water and applied without further processing to a diversity of uses, or if desired used as a starting material for further refining steps.

The acid hypochlorite extract obtained from this extraction was neutralized with sodium hydroxide and concentrated to about 12% of its original volume. It was then cooled and filtered to separate lignin T-2-a-1.

The filtrate was concentrated further to about 6% of its original volume. It was then cooled and filtered to separate lignin T-2-a-2. The filtrate remaining after removal of lignin T-2-a-2 was acidified with sulfuric acid to a pH of about 1.5 and steam distilled to separate volatile acids, after which it was filtered to remove lignin T-2-b.

After removal of lignin T-2-b, the solution was brought to a pH of 7 by the addition of lime, and filtered to remove the precipitated calcium sulfate. Thereafter it was concentrated to a sufficiently small volume to effect the precipitation of a substantial proportion of its sodium chloride content. This was removed by filtration, and the solution further concentrated to yield a syrup rich in polysaccharides-other-than-cellulose.

EXAMPLE II

Asplund fiber (normal defibrator fiber) prepared from aspen wood by means of the Asplund defibrator operating under conditions such as to subject the wood during defibration to the action of steam at about 128 to 135 lbs. per square inch for about 1 minute was extracted with a dilute aqueous sodium hypochlorite solution, and the extract fractionated using substantially the same procedure as outlined in Example I for the processing of McMillan aspen fiber and its extract.

EXAMPLE III

McMillan jack pine fiber was treated with a dilute aqueous sodium hypochlorite solution and the extract fractionated using substantially the same procedures as described in Example I, except that the usage of sodium hydroxide was about 70% rather than about 35% as in Example I.

EXAMPLE IV

Normal defibrator jack pine fiber was also similarly processed with dilute sodium hypochlorite solution, and the extract treated for lignin and polysaccharides-other-than-cellulose removal, all as described in Example I, with the exception that the sodium hydroxide usage was 70%.

The yields of the various products obtained by the application of the process of the invention to the various types of wood fibers, as described in the foregoing examples, may be summarized as follows:

Table I
YIELDS OF PRODUCTS
[In percent by weight of original fiber.]

|  | McMillan Aspen (Example 1) | Asplund Aspen (Example 2) | McMillan Jack pine (Example 3) | Asplund Jack pine (Example 4) |
|---|---|---|---|---|
| Extracted fiber | 89.9 | 82.3 | 77.3 | 63.3 |
| Total material extracted (Diff.) | 10.1 | 17.7 | 22.7 | 36.7 |

COMPOSITION OF EXTRACT T-II

| Lignins: | | | | |
|---|---|---|---|---|
| T-2-a-1 | 1.3 | 2.9 | 5.9 | 7.5 |
| T-2-a-2 | 1.6 | 1.3 | 8.4 | 7.4 |
| T-2-b | 1.3 | 2.9 | 7.5 | 7.7 |
| Total Lignins | 4.2 | 7.1 | 21.8 | 22.6 |
| Total Polysaccharides | 6.7 | 10.9 | 13.5 | 18.9 |
| Volatile Acids | 1.3 | 1.2 | 2.4 | 3.6 |
| Total Organics Recovered [1] | 12.2 | 19.2 | 37.7 | 45.1 |

[1] The increase in total organics recovered from Extract T-II over the total material extracted is accounted for by the presence of impurities, and where the increase is quite large, it is probably due to combined chlorine.

The lignin composition of the original fibers and the treated fibers are shown in the following table:

Table II
LIGNIN PERCENT COMPOSITION OF FIBERS

|  | Before Extraction | After Extraction With Sodium Hypochlorite |
|---|---|---|
|  | Lignin | Lignin |
| McMillan Aspen (Example 1) | 20.1 | 5.2 |
| Asplund Aspen (Example 2) | 20.8 | 4.3 |
| McMillan Jack Pine (Example 3) | 29.6 | 8.1 |
| Asplund Jack Pine (Example 4) | 29.6 | 8.3 |

SUMMARY

The invention is useful as a preliminary process in the general field of utilizing wood to produce cellulose. Instead of cooking wood in pressure digesters, as heretofore, which process is destructive of the ingredients of wood, the present process fractionates the wood, while still providing a raw material for subsequent treatment to secure cellulose. It is possible by the process of the invention to fractionate lignocellulose materials, e. g. wood, into high yields of useful cellulose, lignins and polysaccharides-other-than-cellulose. Each of these products obtained by this invention has many developed and potential industrial uses. The cellulosic fiber residue, Fiber T–II, may be used as is, or may be used as a raw material to be processed further for the production of technical cellulose, and also for the production of chemical cellulose, or alpha cellulose. When the raw lignocellulose material is sawdust, hogged fuel, or similar comminuted material, the cellulosic product corresponding to Fiber II is useful where a non-felting cellulosic fibrous product is desired. The extracted substances likewise have important uses. The lignins, for example, may be used in the manufacture of plastic clad plywood, impregnated papers, the tanning of leather, and as reagents for the recovery of metals from dilute solutions of metal salts. The polysaccharides obtainable by the process of the invention may be used, for example, as humectants and crystallization controllers, and may be fermented or otherwise treated to form other valuable products. Both the lignins and the polysaccharides may be utilized as raw materials for the preparation of valuable organic compounds, as by controlled oxidation processes.

The present invention effects for the first time on a commercial economic scale the separation of lignins and polysaccharides from the same solution. The process also results in the manufacture of a cellulose residue without loss of the valuable lignin and polysaccharides-other-than-cellulose products, since, as has been described herein, the procedure is such as to recover substantially all of the original lignocellulose substances. Since the operating conditions and the concentration of the reagents used are relatively mild, the procedure does not drastically change the chemical composition of the wood substance. On the contrary, the extracted substances are obtained in forms at least approaching, if not identical with, the forms in which they are found in the wood itself. The chemical reactivity and, therefore, the usefulness of the extracted substances is far greater than the reactivity of corresponding substances obtained from liquors from conventional pulping processes that employ drastic cooking conditions. By using different woods and slightly varying the operating procedures, it is thus possible to produce a variety of products having a substantial range in properties so as to be useful for a diversity of purposes. These manifold advantages are achieved, furthermore, by a process which makes use of relatively inexpensive reagents and apparatus and does not require the use of pressure vessels and protracted cooking operations.

It is also apparent from a consideration of the flow plan that the process of the invention for the separation of the constituents of the hypochlorite extract, T–II, is flexible and may be varied as desirable or necessary when processing different materials, especially different species of woods, over a wide range of operating conditions and with different reagent concentrations. Thus, although it is usually desirable to separate the total lignin content into specific component lignins, because of the differences in properties of these lignins, and also because of the simplicity of operation obtainable when the total lignin content is isolated stepwise, it may be desired, for example, to effect the total precipitation of the lignins in a single step, as by acidifying the extract to a pH of 1.5 and effecting the necessary concentration. It may also be desirable to control the process so as to obtain various combinations, less than the total lignin content, as composite lignin products. It is also possible to recombine the lignins resulting from stepwise isolation in order to form a lignin product containing substantially all the lignin content of the extract.

All the various modifications that may be practiced within the spirit of the disclosure herein and the novel products which may be obtained from the practice of the invention are deemed included in the invention.

What is claimed is:

1. The process of treating comminuted lignocellulose raw material to form a fibrous product and chemical products therefrom, which comprises the steps of subjecting at least the water-insoluble content of the lignocellulose material to the action of an aqueous solution of alkali-metal hypochlorite, separating the dissolved content of the solution of reaction between the said lignocellulose material and said aqueous solution of alkali metal hypochlorite from the fibrous residue of said lignocellulose material, adjusting the pH and inorganic salt concentration of said solution to cause the lignin content to precipitate, separating the precipitated lignin content as an intermediate product or products and to leave as a last product a solution containing other organics including polysaccharides.

2. The process of treating comminuted lignocellulose raw material to form a fibrous product and a chemical product therefrom, which comprises the steps of subjecting at least the water-insoluble content of the lignocellulose material to the action of an aqueous solution of alkali-metal hypochlorite, separating the dissolved content of the solution of reaction between the said lignocellulose material and said aqueous solution of alkali metal hypochlorite from the fibrous residue of said lignocellulose material to obtain said fibrous residue as a first product, adjusting the pH of the said solution containing said dissolved content to approximately 7, conditioning the said aqueous solution by establishing a substantial concentration of salt therein whereby a lignin material is precipitated, and separating said lignin material as a second product.

3. The process of treating comminuted lignocellulose raw material to form a fibrous product and chemical products therefrom, which comprises the steps of reacting the lignocellulose material with an aqueous solution of an alkali-metal hypochlorite, extracting the solution of reaction between the said lignocellulose material and said aqueous solution of alkali-metal hypochlorite with an aqueous solvent the reaction products soluble therein, separating the fibrous residue of said lignocellulose material as a first product, adding an alkaline reacting compound of an alkali metal to neutralize the solution of reaction between the said lignocellulose material and said aqueous solution of alkali metal hypochlorite obtained after separating the fibrous residue, concentrating the neutralized solution to a value approximating the saturation point of the inorganic chloride salt content whereby a lignin material is precipitated, and separating said lignin material as a second product.

4. The process of claim 3 together with the further steps of concentrating the neutralized solution remaining after separation of the precipitated lignin as a second product to about one-half its volume, and separating precipitated lignin as a third product.

5. The process of claim 3 together with the further steps of concentrating the neutralized solution remaining after the separation of the precipitated lignin as a second product to about one-half its volume, separating precipitated lignin as a third product, and acidifying the solution remaining after the separation of said third product to a pH of about 1.5 to effect precipitation of another lignin product, and separating said last mentioned lignin product.

6. The process of claim 3 together with the further steps of acidifying the neutralized solution remaining after the separation of the precipitated lignin as a second product to a pH in the range from 7 to about 1.5 to effect precipitation of another lignin product, and separating said last mentioned lignin product.

7. The process of claim 3 together with the further steps of acidifying the neutralized solution remaining after the separation of the precipitated lignin as a second product to a plurality of successive lower pH's in the range from 7 to 1.5, and separating the lignin materials which precipitate at each successive lower pH.

8. The process of claim 3 together with the further steps of concentrating the neutralized solution remaining after the separation of the precipitated lignin as a second product to about one-half its volume, and then acidifying the solution remaining to a pH of about 1.5 to effect precipitation of the remaining lignin content, and separating said precipitated lignin to recover the same as a third product.

9. The process of treating comminuted lignocellulose raw material to form a fibrous product and chemical products therefrom, which comprises the steps of subjecting at least the water-insoluble content of the lignocellulose material to the action of an aqueous solution of alkali-metal hypochlorite salt, separating the dissolved content of the solution of reaction between said lignocellulose material and said aqueous solution of alkali metal hypochlorite from the fibrous residue of lignocellulose material to obtain the latter as a first product, adding to the said solution obtained from the separation of said fibrous residue an inorganic acid having an ionization potential sufficient to bring the pH to about 1.5, and separating the lignin thereof as a second product.

10. The process of claim 9 in which there is further included the steps, before adding the inorganic acid as specified in said claim 9, of neutralizing with an alkaline reacting compound of an alkali metal the solution of reaction between the said lignocellulose material and said aqueous solution of alkali metal hypochlorite obtained from the separation of said fibrous residue, and concentrating the neutralized solution to a reduced volume.

11. The process of claim 9 in which there is further included the steps, before adding the inorganic acid as specified in said claim 9, of neutralizing with an alkaline reacting compound of an alkali metal the solution of reaction between the said lignocellulose material and said aqueous solution of alkali metal hypochlorite obtained from the separation of said fibrous product, concentrating the neutralized solution to a value approximating the saturation point of the inorganic chloride salt content, and then further concentrating the neutralized solution to about one-half the volume.

12. The process of treating comminuted lignocellulose raw material to form a fibrous product and a chemical product therefrom, which comprises the steps of subjecting at least the water-insoluble content of the lignocellulose material to the action at a temperature not over 75° C. of an aqueous solution of alkali-metal hypochlorite salt having initially a pH from 8 to 8.3 until the residual solution of reaction between the said lignocellulose material and said aqueous solution of alkali metal hypochlorite has a pH from 5.5 to 6.5, separating the dissolved content of the solution of reaction between the said lignocellulose material and said aqueous solution of alkali metal hypochlorite from the fibrous residue of said lignocellulose to obtain the latter as a first product, adjusting the pH of an aqueous solution containing said dissolved content to a value in the range from 7 to about 1.5, conditioning the said solution by establishing a substantial concentration of salt therein whereby a lignin material is precipitated, and separating said lignin material as a second product.

13. The process of treating wood in defibered form to form a fibrous product and a chemical product therefrom, which comprises the steps of extracting the defibered wood with water to remove water-soluble content as a water extract and leave a fibrous residue of defibered wood, subjecting said fibrous residue to the action at a temperature not over 75° C. of an aqueous solution of alkali metal hypochlorite salt having initially a pH from 8 to 8.3 until the residual solution of reaction between the said lignocellulose material and said aqueous solution of alkali metal hypochlorite has a pH from 5.5 to 6.5, separating the dissolved content of the said solution from the fibrous residue to obtain the latter as a first product, adjusting the pH of an aqueous solution containing said dissolved content to a value in the range from about 7 to about 1.5, dewatering the said solution thereby to increase the salt concentration substantially to the crystallization point whereby a lignin material is precipitated, and separating said lignin material as a second product.

14. The process of treating wood in defibered form to form a fibrous product and chemical products therefrom, which comprises the steps of extracting the defibered wood with water to remove water-soluble content as a water extract and leave a fibrous residue of wood, subjecting said fibrous residue to the action at a temperature below the boiling point of an aqueous solution of alkali metal hypochlorite salt having initially a pH from 8 to 8.3 until the residual solution of reaction between the said lignocellulose material and said aqueous solution of alkali metal hypochlorite has a pH from 5.5 to 6.5, separating the dissolved content of the said solution from the fibrous residue of the defibered wood to obtain the latter as a first product, adjusting the pH of an aqueous solution containing said dissolved content approximately to 7, dewatering the said neutralized solution thereby to increase the salt concentration substantially to the crystallization point whereby a lignin material is precipitated, separating said lignin material as a second product, adjusting the pH of the solution to any value in the range from 7 to 1.5, dewatering the adjusted solution to effect a precipitation of additional lignin, and separating the said lignin from the liquid.

15. The process of treating comminuted lignocellulose raw material to form a fibrous product and chemical products therefrom, which comprises the steps of subjecting at least the water-insoluble content of the lignocellulose material to the action of an aqueous solution of alkali-metal hypochlorite, separating the dissolved content of the solution of reaction between the said lignocellulose material and said aqueous solution of alkali metal hypochlorite from the fibrous residue of the defibered wood to obtain the latter as a first product, processing said solution to separate therefrom the lignin as an intermediate product or products, and adding to the liquor obtained from the separation of the lignin content an alkaline reacting material to raise the pH of said liquor to an equilibrium value at substantially the neutral point, solidifying the inorganic content of said liquor, and separating the solidified inorganic content from the neutral solution, whereby to provide said neutral solution as a liquid concentrate of organics including polysaccharides-other-than-cellulose.

16. The invention as defined in claim 1 in which the adjustment of the pH of said solution containing other organics including polysaccharides is made with sulfuric acid to a pH of 1.5 to separate therefrom the lignin content, and then the further steps after separating the lignin content of adding to the solution containing other organics including polysaccharides an alkaline-earth metal compound of the group consisting of hydroxides, carbonates and oxides to raise the pH thereof to an equilibrium value thereby precipitating alkaline-earth metal sulfate, and separating the alkaline-earth metal sulfate to provide said solution containing other organics including polysaccharides of claim 1 of greater purity and in substantially neutral state.

17. The process of treating wood in defibered form to form a fibrous product and a chemical product therefrom, which comprises the steps of reacting the wood with a dilute alkali-metal hypochlorite solution in quantity up to about 80 parts of sodium hydroxide equivalent of the hypochlorite salt for 100 parts by weight of said wood fiber, the reaction with the hypochlorite being conducted for about one hour and at a temperature below the boiling point of the solution, separating the fibrous residue of the defibered wood from the solution of reaction between the said defibered wood and said aqueous solution of alkali metal hypochlorite to obtain the fiber as a first product, neutralizing the said solution with an alkaline reacting compound of an alkali-metal, concentrating the said neutral solution to a value approximating the saturation point of the inorganic chloride salt content, and separating precipitated lignin as a second product.

18. The process of treating comminuted lignocellulose raw material to form a fibrous product and chemical products therefrom, which comprises the steps of extracting the lignocellulose material with water, separating the water extract from the lignocellulose residue to obtain the water extract as a first product, reacting the lignocellulose residue with an aqueous solution of an alkali metal hypochlorite, extracting with an aqueous solvent the reaction products of the reaction between the said lignocellulose material and said aqueous solution of alkali metal hypochlorite soluble therein, separating the lignocellulose residue as a second product, adjusting the pH and inorganic salt concentration of the said aqueous solution containing said reaction products to precipitate the lignin content, separating the precipitated lignin content as a third product and to leave as the last product a solution containing other organics including polysaccharides-other-than-cellulose.

19. The process of claim 18 in which the water extract obtained as a first product is used as the aqueous solvent for the reaction products of the reaction between the said lignocellulose and said aqueous solution of alkali metal hypochlorite.

References Cited in the file of this patent

UNITED STATES PATENTS

| Number | Name | Date |
|---|---|---|
| 2,541,058 | Heritage et al. | Feb. 13, 1951 |
| 2,541,059 | Heritage et al. | Feb. 13, 1951 |
| 2,541,127 | Van Beckum | Feb. 13, 1951 |

OTHER REFERENCES

"Wood Chemistry" (Wise), published by Reinhold Publ. Corp., N. Y. C., 1944.

"Chemistry of Lignin" (Brauns), published by Academic Press Inc., N. Y. C., 1952.